July 20, 1965
O. R. SCHOENROCK
3,195,900
BEARING SEAL CONSTRUCTION
Filed Sept. 22, 1961
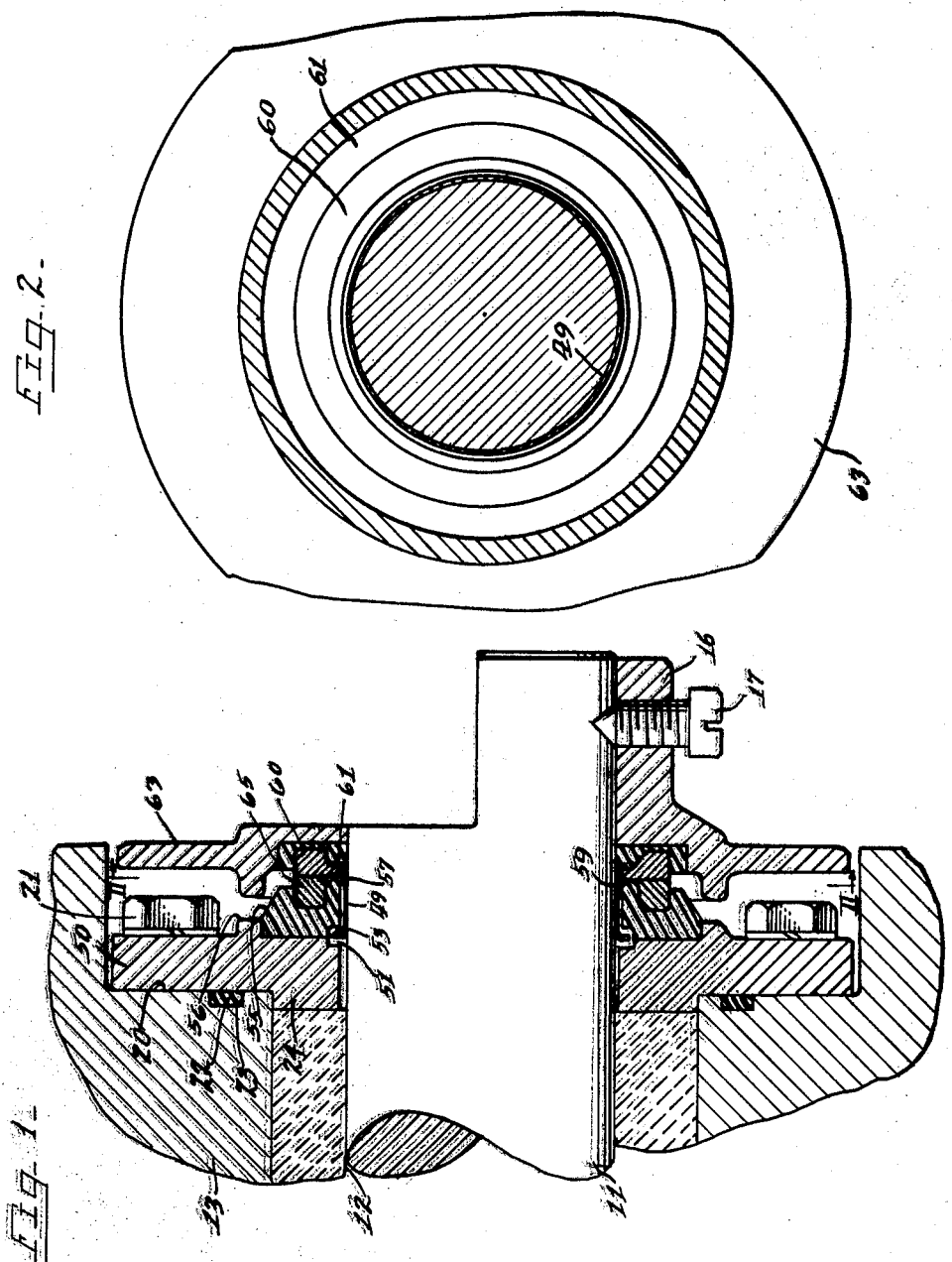
INVENTOR.
Otto R. Schoenrock
BY
ATTYS.

3,195,900
BEARING SEAL CONSTRUCTION
Otto R. Schoenrock, 138 N. Taylor Ave., Oak Park, Ill.
Filed Sept. 22, 1961, Ser. No. 140,108
2 Claims. (Cl. 277—9)

This invention relates to improvements in bearing sealing constructions and more particularly relates to a simplified and improved form of end face seal for sealing two relatively movable parts.

A principal object of the invention is to provide a simplified and improved form of end face seal constructed with a view toward utmost efficiency and simplicity in construction and operation.

Another object of the invention is to provide an end face seal for retaining lubricant to a bearing and the like having a minimum number of parts and capable of being economically produced.

Still another object of the invention is to provide an improved form of end face seal between two relatively movable parts in which the end face sealing members are retained in position and biased into sealing engagement with each other by resilient retainer rings.

A further object of the invention is to provide an improved form of end face seal particularly adapted for sealing the bearings for crawler track rollers and so arranged as to provide a continuing seal regardless of wear of the bearing for the roller.

A further object of the invention is to provide an improved form of end face seal for sealing two relatively movable parts in which facing metal seals are mounted in and pressed into sealing engagement with each other by resilient sealing retainers and in which the resilient sealing retainers form sealing means for a shaft or the like and with the face seal provide three sealing points.

These and other objects of the invention will appear from time to time as the following specification proceeds and with reference to the accompanying drawings wherein:

FIGURE 1 is a longitudinal sectional view taken through a seal constructed in accordance with the invention showing the seal mounted on a shaft and showing a fragment of a bearing and roller rotatably mounted thereon;

FIGURE 2 is a fragmentary sectional view taken substantially along line II—II of FIGURE 1.

In the embodiment of the invention illustrated in the drawings, the seal is shown as being mounted on a non-rotatable shaft 11 and as sealing said shaft and a bearing 12 having a roller 13 rotatably mounted thereon. The roller 13 may be a crawler track roller supporting crawler continuous traction devices for supporting and propelling tractors and the like. The bearing 12 is shown as being a plain bearing for illustrative purposes, but may be a ball or roller bearing.

The seal is disposed about the shaft 11 on the outside of the bearing 12 and inside of an annular retainer plate 63 having a hub 16 mounted on the shaft 11 and held in position on said shaft as by a set screw 17. A second annular retainer plate 50 is mounted in a recessed portion 20 of the roller 13 and is secured thereto as by machine screws 21. The retainer plate 50 is shown in FIGURE 1 as pressing an O-ring 22 into a sealing recess 23 to seal the recessed portion 20 of the roller 13. The retainer plate 50 is also shown as having an inner axially extending circumferentially flanged portion 24 extending along the inner periphery of the roller 13 into abutting engagement with the bearing 12. A space is provided between the inner periphery of the retainer plate 50 and the shaft 11, to accommodate free rotation of said retainer plate with the roller 13 about the shaft 11.

The retainer plate 50 has an outwardly facing circumferential flange 56 extending outwardly from the outer face thereof and intermediate the ends of said face and adapted to be abutted by an annular resilient seal mounting member 55. The seal mounting member 55 may be made from rubber, an elastomer or from any other well known substitute for rubber.

The resilient seal mounting member 55 may be cemented or otherwise mounted to the retainer plate 50 in abutting engagement with the circumferential flange 56 thereof. The resilient seal mounting member 55 has an axially extending sealing lip 57 engaging a radially inwardly extending annular metallic face of a metallic face seal 60. The face seal 60 is carried in a resilient seal mounting member 61 recessed in the inner side of a retainer plate 63 and cemented or otherwise secured to said retainer plate 63.

The annular face seal 60 is engaged by a metallic annular face seal 65 mounted in the seal mounting member 55 to prevent the loss of oil from the inside and also to prevent water or dirt from entering from the outside. As shown in FIGURE 1, the metallic face seal 65 is partially recessed in the resilient seal mounting member 55 and is cemented or otherwise secured thereto. The adjacent sealing faces of the annular face seals 60 and 65 may be ground and lapped. The sealing lip 57 bearing against the circumferential flange 59 also retains oil to the roller as does the seal mounting member 61 having sealing engagement with the shaft 11. The annular retainer 49 may be made from a suitable plastic or a light weight metal and one upturned rim 53 thereof is shown in FIGURE 1 as extending between the seal mounting member 61 and the face seal 60. The retainer 49 may be cemented or otherwise secured to said seal mounting member and face seal. The inner face of the retainer 49 is spaced radially outwardly of the shaft 11, and as previously mentioned, the opposite upturned rim 53 thereof extends into the annular recessed portion 51, and serves to retain the sealing assembly together for assembly on the shaft 11. The space between the retainer 49 and inner margin of the seal mounting member 55 may be filled with grease if desired.

It may be seen from the foregoing that a simple and inexpensive face seal has been provided in which two rigid sealing members are biased into sealing engagement with each other by the resiliency of the mounting means therefor.

It may further be seen that by mounting the rigid sealing members in resilient mounting means, that as wear occurs in the bearing 12, movement of the roller 13 radially of its shaft is compensated for and the life of the seal, without the liability of leakage past the rigid sealing members, due to the wear of the bearing, is greatly increased.

It may further be seen that the seal of the invention may be preassembled either on the shaft 11 or may be preassembled and placed on the shaft 11.

It may further be seen that the seal seals at three points to more positively prevent the leakage of oil from the bearing and the entrance of water or other foreign material to the bearing and that where it may be advantageous, the seal may be reversed from the position shown in FIGURES 1 and 5.

While I have herein shown and described several forms in which the invention may be embodied, it may readily be understood that various variations and modifications in the invention may be attained without departing from the spirit and scope of the novel concepts thereof as defined by the claims appended hereto.

I claim as my invention:

1. An oil seal for a joint between two relatively rotatable parts comprising a first seal retaining plate concentric with said parts and fixedly mounted on one of said parts and retained from axial movement by said part, a second seal retaining plate concentric with said parts and fixedly mounted on the other of said parts, annular resilient seal mounting means fixedly mounted on said retainer plates and facing each other, an annular face seal mounted in each seal mounting means, said face seals being in axial alignment with each other and being pressed into sealing engagement with each other by the resiliency of said mounting means, and one of said seal mounting means having an axially extending sealing lip extending axially beyond the face seal supported by said mounting means and having sealing engagement with the face seal mounted in the other of said seal mounting means.

2. An oil seal in accordance with claim 1 wherein one of said resilient seal mounting means has sealing engagement with its associated relatively rotatable part and wherein an annular retainer is spaced radially inwardly of the face seals and has opposite upturned rim portions extending radially outwardly along said seal mounting means and retaining said seal mounting means and face seals together for assembly of the seal on said relatively movable parts as a unit.

References Cited by the Examiner
UNITED STATES PATENTS

| | | | |
|---|---|---|---|
| 2,265,951 | 12/41 | Miner. | |
| 2,395,095 | 2/46 | Brady | 277—89 |
| 2,414,600 | 1/47 | Land. | |
| 2,614,006 | 10/52 | Bechman | 308—36.1 |
| 2,712,461 | 7/55 | Batchelder | 380—36.2 |
| 2,856,210 | 10/58 | Schoenrock | 308—36.2 |

ROBERT C. RIORDON, *Primary Examiner.*

FRANK SUSKO, *Examiner.*